(12) United States Patent
Curles

(10) Patent No.: US 8,091,816 B2
(45) Date of Patent: Jan. 10, 2012

(54) ROUND COTTON MODULE OPENER

(75) Inventor: Curtis Thomas Curles, Cordele, GA (US)

(73) Assignee: CTC Design, Inc., Cordele, GA (US)

( * ) Notice: Subject to any disclaimer, the term of this patent is extended or adjusted under 35 U.S.C. 154(b) by 127 days.

(21) Appl. No.: 12/406,727

(22) Filed: Mar. 18, 2009

(65) Prior Publication Data

US 2009/0238667 A1 Sep. 24, 2009

Related U.S. Application Data

(60) Provisional application No. 61/037,593, filed on Mar. 18, 2008.

(51) Int. Cl.
*B02C 19/00* (2006.01)
*B02C 11/02* (2006.01)
*B02C 21/00* (2006.01)
*B02C 23/00* (2006.01)

(52) U.S. Cl. ........................ 241/200; 241/605
(58) Field of Classification Search .................. 241/605, 241/200
See application file for complete search history.

(56) References Cited

U.S. PATENT DOCUMENTS

| | | | |
|---|---|---|---|
| 3,757,973 A | 9/1973 | Lambert et al. | |
| 3,991,944 A | 11/1976 | Baikoff | |
| 4,057,876 A | 11/1977 | Sawyer | |
| 4,078,733 A * | 3/1978 | Popiolek | 241/200 |
| 4,390,312 A * | 6/1983 | Skeem | 414/24.6 |
| 4,545,716 A * | 10/1985 | Pearce | 414/24.6 |
| 4,592,698 A | 6/1986 | Semp et al. | |
| 4,610,596 A | 9/1986 | Bouldin et al. | |
| 4,789,289 A * | 12/1988 | Wilson | 414/24.6 |
| 4,929,141 A | 5/1990 | Keesey et al. | |
| 5,179,878 A | 1/1993 | Kranefeld et al. | |
| 5,228,628 A | 7/1993 | Temburg et al. | |
| 5,318,399 A | 6/1994 | Marom | |
| 5,340,040 A | 8/1994 | Bussiere et al. | |
| 5,371,938 A | 12/1994 | Martin | |
| 5,454,683 A | 10/1995 | Marom et al. | |
| 5,771,661 A | 6/1998 | Martin | |
| 6,202,950 B1 | 3/2001 | Hruska | |
| 6,332,426 B1 | 12/2001 | van den Berg | |
| 6,481,653 B2 | 11/2002 | Hruska | |
| 6,648,254 B2 | 11/2003 | Hruska | |
| 6,786,438 B2 | 9/2004 | Winn | |
| 2007/0181469 A1 | 8/2007 | Stover | |
| 2007/0200382 A1 * | 8/2007 | Reuser et al. | 296/24.31 |
| 2008/0052876 A1 | 3/2008 | Stover | |
| 2009/0205932 A1 | 8/2009 | Stover | |
| 2009/0297309 A1 | 12/2009 | Stover | |
| 2010/0024617 A1 | 2/2010 | Stover | |
| 2010/0025187 A1 | 2/2010 | Stover | |
| 2010/0028112 A1 | 2/2010 | Stover | |
| 2010/0028118 A1 | 2/2010 | Stover | |

(Continued)

*Primary Examiner* — Bena Miller
(74) *Attorney, Agent, or Firm* — Nelson Mullins Riley & Scarborough, LLP

(57) ABSTRACT

A round module opener for use with a round module of cotton including a first cradle movably mounted to a first frame, the first cradle including a first peeler belt that is configured for rotary motion, and a second cradle movably mounted to a second frame, the second cradle including a second peeler belt that it configured for rotary motion. The first cradle and the second cradle are disposed on opposing sides of a feeder bed such that the first cradle and the second cradle can be moved inwardly toward each other and toward a longitudinal centerline of the feeder bed to engage the round module of cotton.

14 Claims, 5 Drawing Sheets

U.S. PATENT DOCUMENTS

| | | |
|---|---|---|
| 2010/0028119 A1 | 2/2010 | Stover |
| 2010/0146739 A1 | 6/2010 | Stover |
| 2010/0146912 A1 | 6/2010 | Stover |
| 2010/0263169 A1 | 10/2010 | Stover |
| 2010/0269304 A1 | 10/2010 | Stover |
| 2010/0270383 A1 | 10/2010 | Stover |
| 2010/0288601 A1 | 11/2010 | Stover |
| 2010/0307120 A1 | 12/2010 | Stover |

* cited by examiner

ROUND COTTON MODULE OPENER

CLAIM OF PRIORITY

This application claims priority to U.S. Provisional Patent Application Ser. No. 61/037,593, filed Mar. 18, 2008, the entire disclosure of which is hereby incorporated by reference herein.

TECHNICAL FIELD

The present invention relates generally to a device for removing a wrap from a bale of a fibrous substance. More particularly, the present invention relates to a device for removing a wrap from a cylindrically-shaped cotton module.

BACKGROUND

Some recently developed cotton pickers roll and wrap cotton into a cylindrically-shaped module, hereafter referred to as a "round module." This is done inside the picker as the cotton is picked in the field. A typical round module can measure 7 to 8 feet in diameter, 8 feet in length, and weigh about 7,000 pounds. Typically, the picking machine can store one wrapped module as it makes another. This enables the farmer to pick cotton for the second module without having to stop so that the previously wrapped module can be dropped off at the edge of the field. The new cotton pickers eliminate up to three pieces of equipment when compared to previous methods, and the labor to operate them. For example, the three pieces of equipment could be an old-style rectangular module builder, a bowl buggy and a tractor. Many cotton gins are not presently configured to process the new round modules.

Currently, feeders for cotton gins are supplied in three basic types: roller bed, moving chain and reciprocating slats. Typical roller bed and moving chain type feeders have beds that are 60 to 80 feet in length. The beds are often divided into three sections so that modules can be loaded on one end and caught up to any previously loaded modules. Sections of the bed are simply turned on and off as needed to butt modules end to end before entering the dispersing head of the cotton gin, which is located at the opposite end of the feeder bed from where the bales are loaded. The reciprocating slats type of feeder does not have the ability to catch-up modules, therefore trucks must unload modules by backing onto the moving floor. Trucks must butt modules together during the unloading for efficient ginning.

The present invention recognizes and addresses considerations of prior art constructions and methods.

SUMMARY OF THE INVENTION

An embodiment of the present invention provides a round module opener for use with a round module of cotton to be fed into a cotton gin including a feeder bed. The round module opener includes a first cradle movably mounted to a first frame, the first cradle including a first peeler belt that is configured for rotary motion, and a second cradle movably mounted to a second frame, the second cradle including a second peeler belt that it configured for rotary motion. The first cradle and the second cradle are disposed on opposing sides of the feeder bed such that the first cradle and the second cradle can be moved inwardly toward each other and toward a longitudinal centerline of the feeder bed to engage the round module of cotton.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended drawings, in which.

Figure 1:
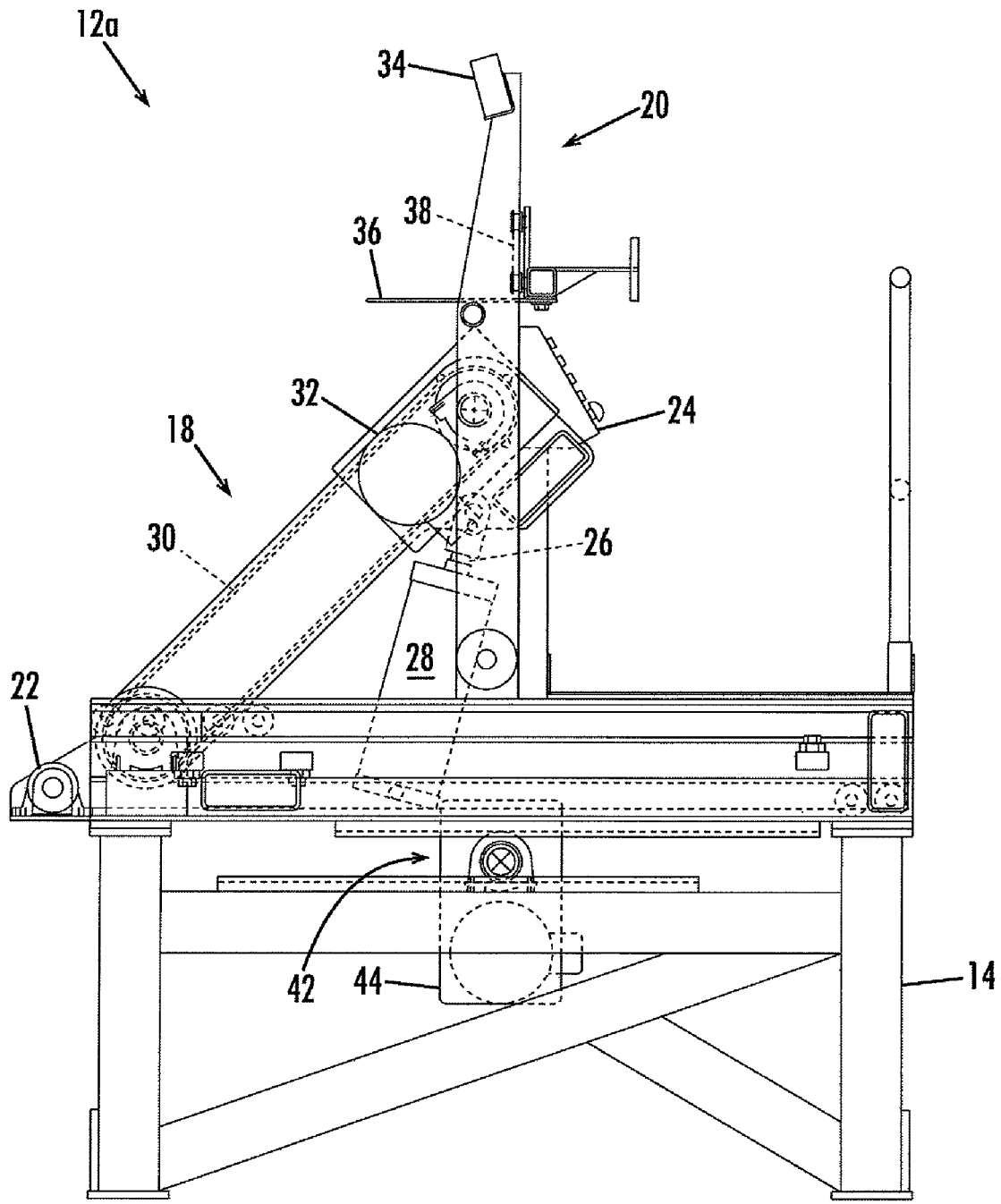
FIG. 1 is a side view of a cradle of a preferred embodiment of a round module opener in accordance with the present invention.

Repeat use of reference characters in the present specification and drawings is intended to represent same or analogous features or elements of the invention according to the disclosure.

DETAILED DESCRIPTION

Reference will now be made in detail to presently preferred embodiments of the invention, one or more examples of which are illustrated in the accompanying drawings. Each example is provided by way of explanation, not limitation, of the invention. In fact, it will be apparent to those skilled in the art that modifications and variations can be made in the present invention without departing from the scope and spirit thereof. For instance, features illustrated or described as part of one embodiment may be used on another embodiment to yield a still further embodiment. Thus, it is intended that the present invention covers such modifications and variations as come within the scope of the appended claims and their equivalents.

Referring now to the figures, a round module opener 10 in accordance with the present invention is shown. Round module opener 10 includes a pair of cradles 12a and 12b that are each movably mounted on a respective frame 14 such that cradles 12a and 12b are positioned on opposing sides of a feeder bed 16 of a cotton gin. Cradle 12a includes a peeler belt assembly 18, a slitter assembly 20, a helper roller 22 and a control station 24.

Figure 5:
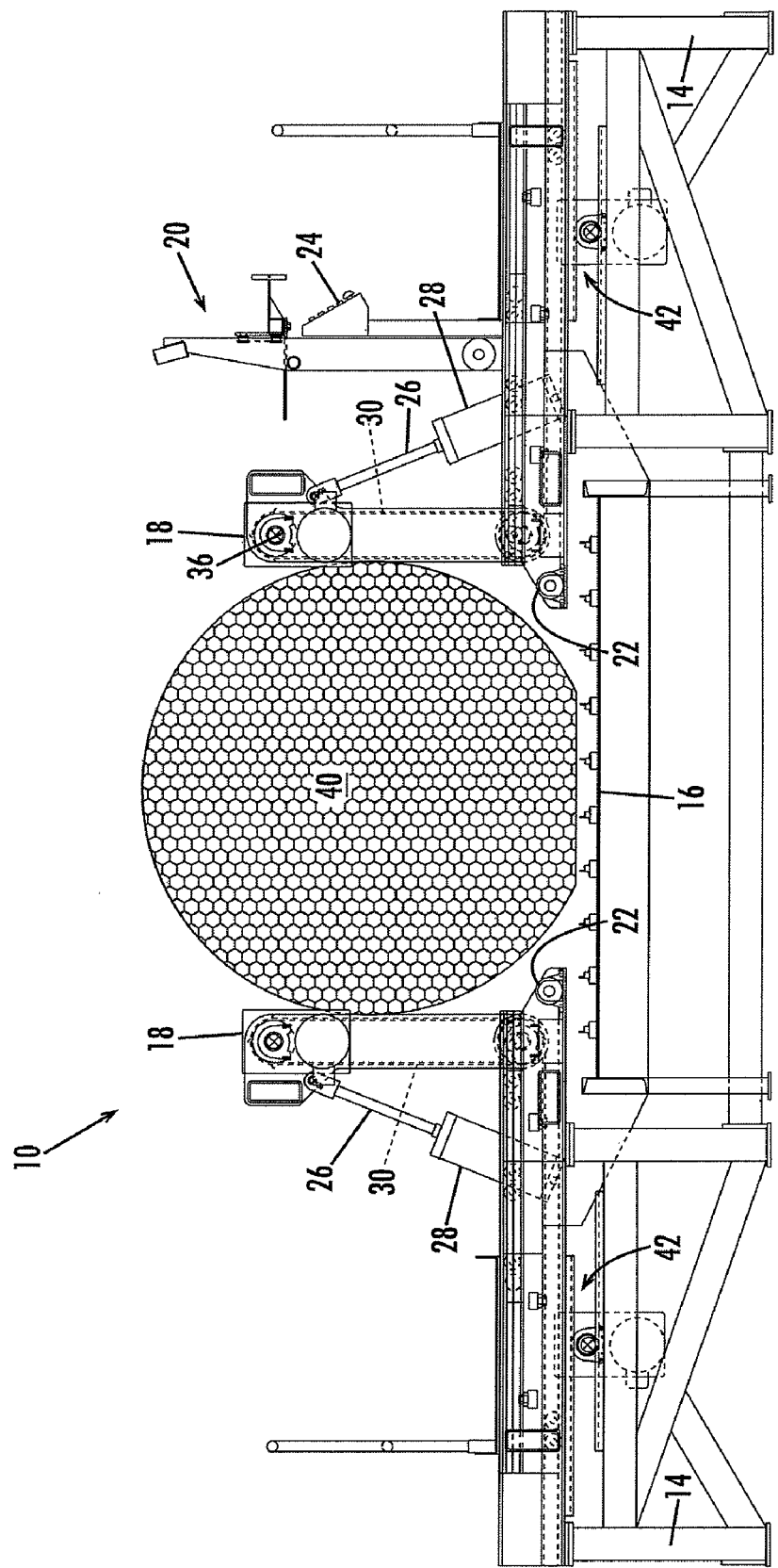
FIG. 5 is a side view of the round module opener as shown in FIG. 2.

In the preferred embodiment shown, cradle 12a includes slitter assembly 20 and control station 24, whereas cradle 12b does not. As such, for ease of description only, cradle 12a is discussed. As best seen in FIG. 1, peeler belt assembly 18 includes a first end that is pivotally mounted to the base of cradle 12a and a second end that is pivotally mounted to a control rod 26 of a pneumatic cylinder 28. As such, as discussed in greater detail below, peeler belt assembly 18 can be tilted from an approximately 45° position to an approximately 90° position (FIG. 5). A peeler belt 30 extends from the first end to the second end of peeler belt assembly 18 and is driven in either the clockwise or counter-clockwise direction by drive motor 32. Preferably, peeler belts 30 have low profile ribs (not shown) sewn onto the outer surface to increase friction, the ribs being spaced approximately 6 to 8 inches from each other. The ribs help to load the round modules 40 onto cradles 12a and 12b as they extend horizontally inwardly over feeder bed 16, as well as provide additional friction for removing a wrap 48 from the round module 40.

Slitter assembly 20 also includes a first end that is pivotally mounted to the base of cradle 12*a*. Slitter assembly 20 includes an RFID tag reader 34 mounted on its second end and a slitter blade 36 that is slidably mounted on a rail 38 that runs parallel to the direction of motion of feeder bed 16. Preferably, slitter assembly 20 is pivotable relative to cradle 12*a* such that slitter 36 can be used on variously sized round modules 40, as discussed below.

Figure 3:
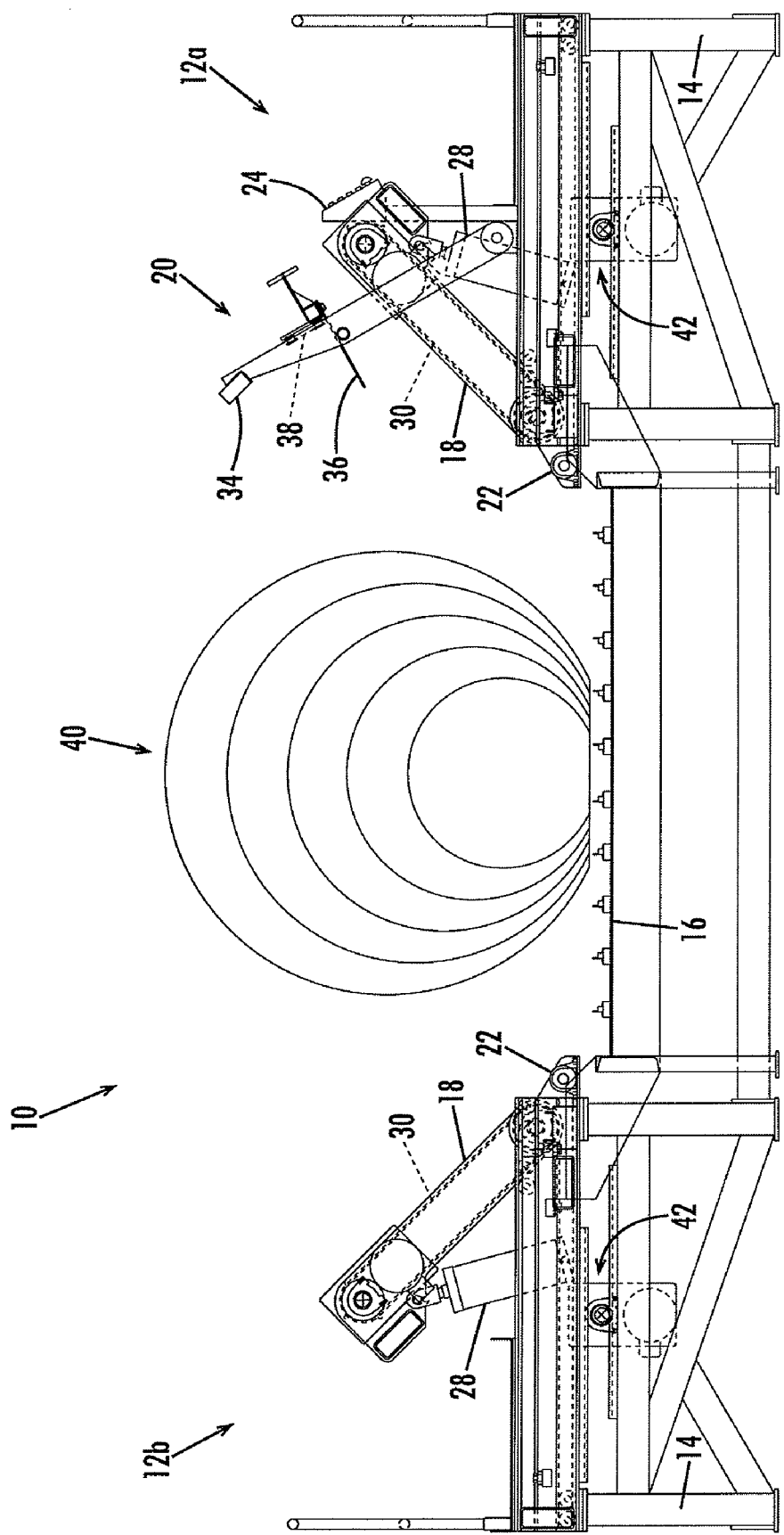
FIG. 3 is a side view of the round module opener as shown in FIG. 2.
Figure 4:
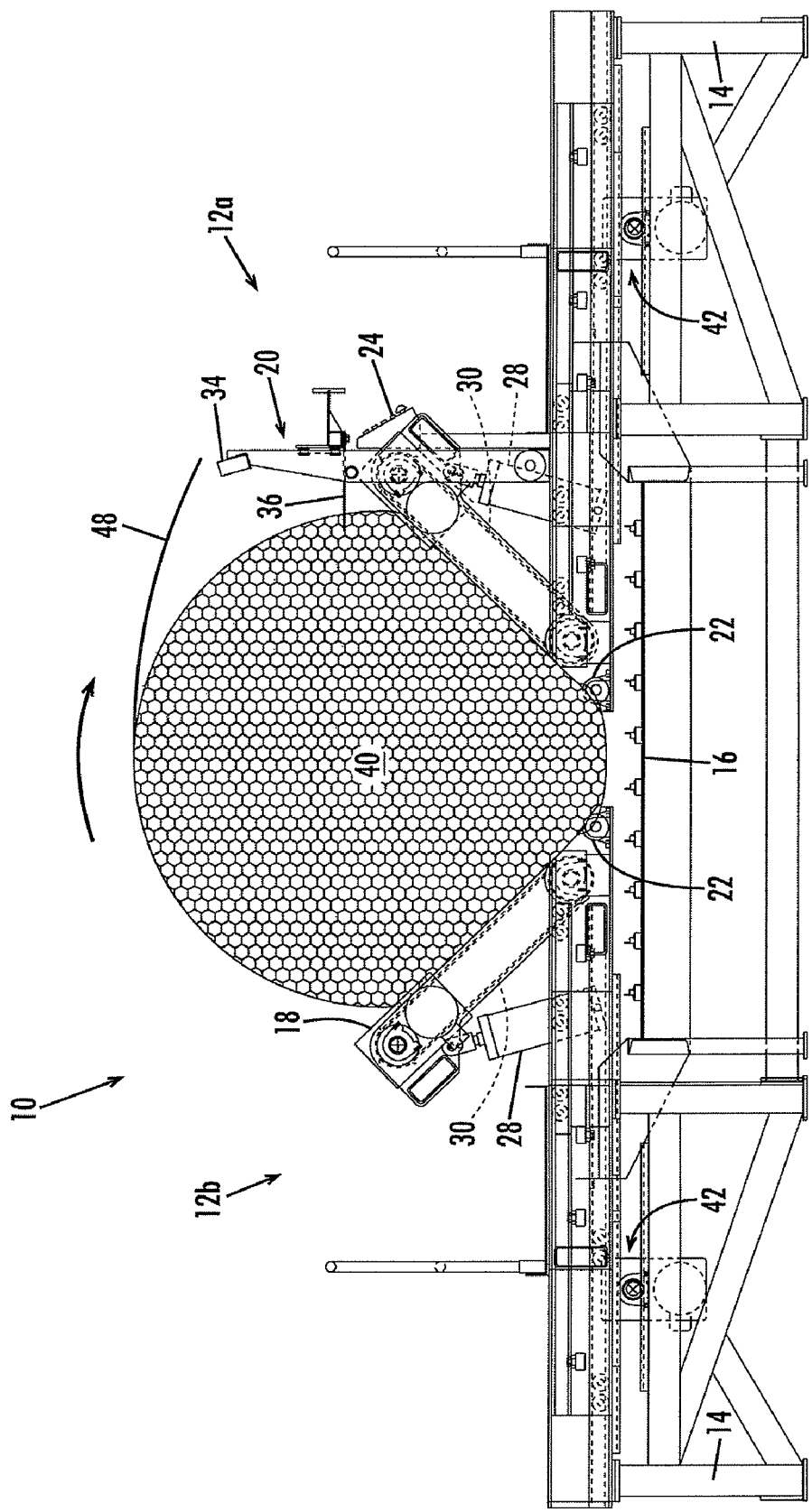
FIG. 4 is a side view of the round module opener as shown in FIG. 2.

The round module opener 10 is designed to scoop a round module 40 of cotton upwardly from feeder bed 16 by utilizing cradles 12*a* and 12*b*, which simultaneously extend horizontally inwardly for scooping. Each of cradles 12*a* and 12*b* is movably mounted on a respective frame 14 that is fixed to the floor of the gin, such as by bolting. In the preferred embodiment shown, each cradle 12*a* and 12*b* is mounted to its respective frame 14 by a telescoping system that is driven by a rack and pinion assembly 42 having a drive motor 44. The top of each frame 14 is designed such that the corresponding cradle 12*a* and 12*b* can telescope horizontally inwardly above feeder bed 16. As best seen in FIGS. 3 through 5, cradles 12*a* and 12*b* are supported above feeder bed 16 because feeder bed 16 is constantly moving cotton into the gin in a direction perpendicular to the telescoping cradles 12*a* and 12*b*. Typically, feeder bed 16 runs continuously to insure the gin has an adequate supply of cotton.

OPERATION

Figure 2:
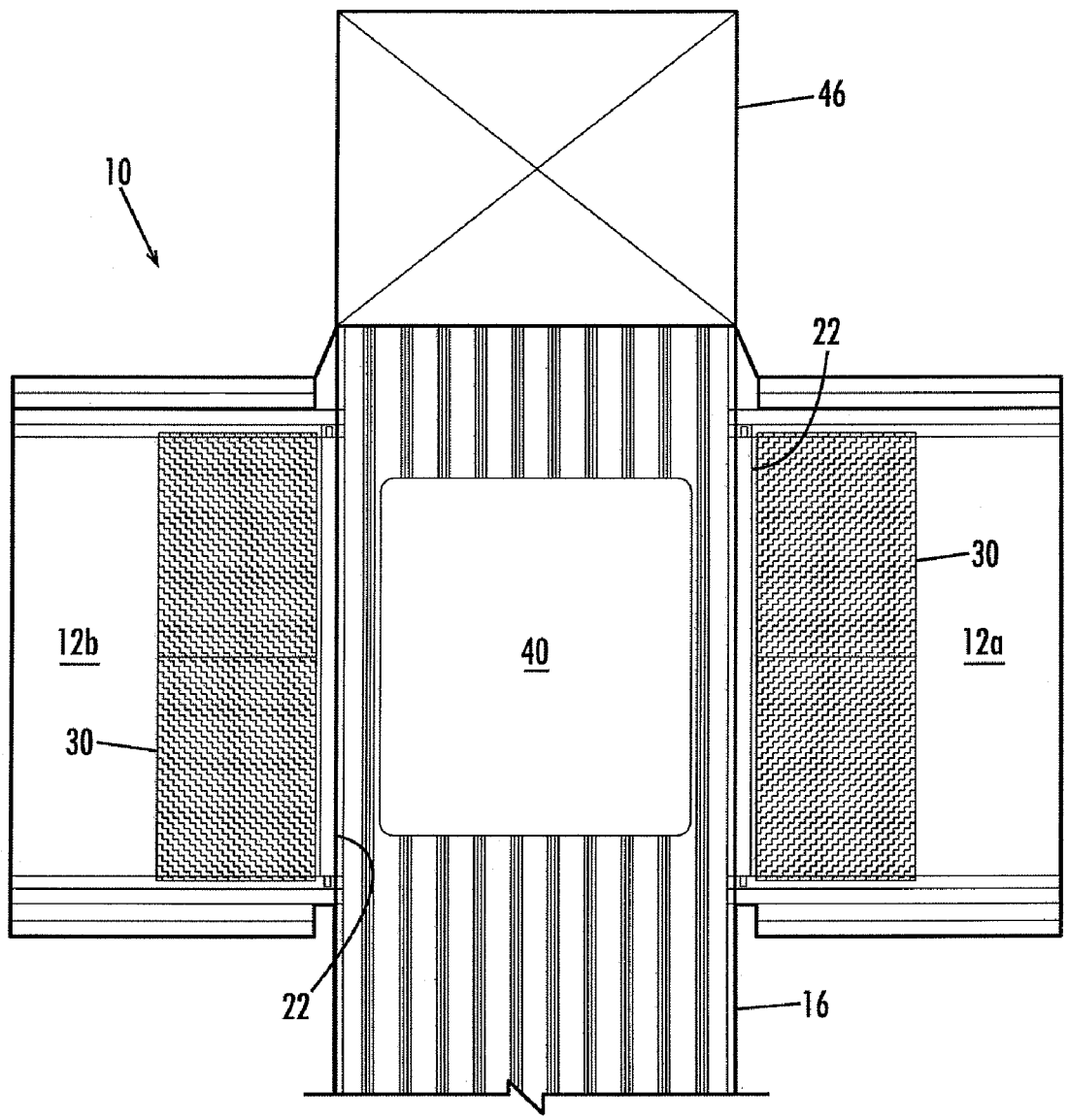
FIG. 2 is a top view of a preferred embodiment of a round module opener in accordance with the present invention.

To remove wrap 48 from a round module of cotton 40 with round module opener 10, round module 40 is first fed into position between cradles 12*a* and 12*b* on feeder bed 16 and stopped when positioned on center, as best seen in FIGS. 2 and 3. The round module 40 can be stopped in position automatically by use of photo eyes (not shown) mounted on cradles 12*a* and 12*b*, or other similar devices.

Next, cradles 12*a* and 12*b* simultaneously move inwardly, centering and elevating round module 40 off of feeder bed 16, leaving clearance beneath the bottom of round module 40 and feeder bed 16 for wrap 48 removal, as best seen in FIG. 4. Note, the multiple circular lines 40 (FIG. 3) indicate that round module opener 10 can be used on variously sized round modules 40 of cotton. As cradles 12*a* and 12*b* close inwardly under round module 40, peeler belts 30 are rotated in opposing directions at a matched rate to assist with elevating round module 40. This action also prevents tearing wrap 48 prematurely. As well, as cradles 12*a* and 12*b* move inwardly, helper rollers 22 initially make contact with round module 40 to help lift round module 40 onto cradles 12*a* and 12*b* without tearing wrap 48.

Next, round module 40 is rotated to find a microchip (not shown) that is typically located on the inside leading edge of wrap 48. The microchip is not visible from the outside of the opaque wrap 48, however, RFID tag reader 34 is used to locate the microchip. Once the microchip is located, peeler belts 30 are rotated as required to properly position the leading edge of wrap 48 above the horizontal centerline of the module. If the leading edge is not positioned above the horizontal centerline, a portion of wrap 48 can be left behind after removal which can then become mixed in with the cotton and, therefore, contaminate the cotton gin.

Round module 40 is rotated by driving peeler belts 30 in the same direction at the same speed. Although FIG. 4 shows the direction of rotation of round module 40 to be in the clockwise direction, round module 40 may also be rotated in the counter-clockwise direction. As well, there may be instances where it is desirable to rotate peeler belts 30 in opposing directions.

Slitter assembly 20 is pivotally mounted to cradle 12*a* such that slitter blade 36 can remain clear of round module 40 during rotation. Slitter assemblies 20 can be provided on both cradles 12*a* and 12*b* so that the operator can choose to cut wrap 48 on either side of round module 40. When round module 40 is properly positioned, slitter blade 36 is slid along rail 38 by the operator such that slitter blade 36 traverses along the length of round module 40 to the opposite end of cradle 12*a*. As round module 40 is rotated after slitting wrap 48, wrap 48 is loosened from round module 40, as shown in FIG. 4. The peeler belts 30 are run for a preset time adjustable from the operator's push button control station 24.

When wrap 48 is free and clear of round module 40, the operator removes wrap 48 by hand and cradles 12*a* and 12*b* are retracted, as best seen in FIG. 5. As cradles 12*a* and 12*b* are retracted, round module 40 is lowered onto the center of the feeder bed 16. Peeler belts 30 are rotated during retraction to deposit cotton from top of the belts onto feeder bed 16 via an apron plate. Spilled cotton above the top conveyor roller will also be discharged back onto the feeder during retraction of cradles 12*a* and 12*b*.

It is not uncommon for the cotton from the round modules 40 to expand during removal of the wrap 48. As such, in the embodiment shown, as cradles 12*a* and 12*b* are retracted, peeler belt assemblies 18 are moved to a substantially vertical position by pneumatic cylinders 28 (FIG. 5). Note, hydraulic cylinders can also be used in place of pneumatic cylinders 28. In this manner, peeler belt assemblies 18 help maintain the cotton in a compact state for entry into dispensing head 46 of the cotton gin. Note, however, in an alternate embodiment of round module opener 10, peeler belt assemblies 18 are not tiltable. Rather, they are fixed in an approximately 45° position relative to the base of the respective cradles 12*a* and 12*b*.

In addition to round module opener 10 discussed above, another embodiment of round module opener 10 for use with the reciprocating slats type feeders is possible. The model for the reciprocating slats type feeder has a rail system (not shown) mounted on top of frames 14 to allow cradle assemblies 12*a* and 12*b* to move parallel to feeder bed 16. A linear actuator is provided on top of each frame 14 to propel cradle assemblies 12*a* and 12*b* at the same speed as the reciprocating slats type feeder to prevent gaps forming between cotton modules being fed into dispensing head 46.

While one or more preferred embodiments of the invention are described above, it should be appreciated by those skilled in the art that various modifications and variations can be made in the present invention without departing from the scope and spirit thereof.

What is claimed:

1. A round module opener for use with a round module of cotton to be fed into a cotton gin including a feeder bed, comprising:

a first cradle movably mounted to a first frame, the first cradle including a first peeler belt that is configured for rotary motion; and a second cradle movably mounted to a second frame, the second cradle including a second peeler belt that is configured for rotary motion, wherein the first cradle and the second cradle are disposed on opposing sides of the feeder bed such that the first cradle and the second cradle can be moved inwardly toward each other and toward a longitudinal centerline of the feeder bed to engage and elevate the round module of cotton from the feeder bed.

2. The round module opener of claim 1, wherein the first and the second frames movably support the first and the second cradles, respectively, in a first plane that is above a second plane in which the feeder bed lies.

3. The round module opener of claim 1, wherein the first feeder belt is pivotably secured to the first cradle and the second feeder belt is pivotably secured to the second cradle such that the first and the second feeder belts are pivotable inwardly toward each other and the longitudinal centerline with the feeder bed.

4. The round module opener of claim 3, wherein the first and the second peeler belts are pivotable inwardly toward each other such that the first and the second peeler belts can be positioned substantially vertically.

5. The round module opener of claim 3, wherein the first and the second peeler belts are pivoted inwardly toward each other as the first and second cradles are moved outwardly to lower the round module of cotton onto the feeder bed.

6. The round module opener of claim 5, wherein the first and the second peeler belts are rotated in opposing directions to lower the round module of cotton onto the feeder bed.

7. The round module opener of claim 1, wherein one of the first and the second peeler belts is rotated in a clockwise direction and the other of the first and the second peeler belts is rotated in a counter-clockwise direction to elevate the round module of cotton from the feeder bed.

8. The round module opener of claim 1, wherein the first and the second peeler belts are rotated in opposing directions to elevate the round module of cotton from the feeder bed.

9. The round module opener of claim 8, wherein the first and the second peeler belts are rotated in the same direction to rotate the round module of cotton after it has been elevated from the feeder bed.

10. A round module opener for use with a round module of cotton to be fed into a cotton gin including a feeder bed, comprising:

a first cradle movably mounted to a frame, the first cradle including a first peeler belt that is configured for rotary motion; and a second cradle movably mounted to the frame, the second cradle including a second peeler belt that is configured for rotary motion, wherein the first cradle and the second cradle are disposed on opposing sides of the feeder bed and are configured to be moved inwardly toward each other and toward a longitudinal centerline of the feeder bed to engage the round module of cotton and the first and the second peeler belts are configured to be rotated in opposing directions to elevate the round module of cotton from the feeder bed.

11. The round module opener of claim 10, wherein one of the first and the second peeler belts is rotated in a clockwise direction and the other of the first and the second peeler belts is rotated in a counter-clockwise direction to elevate the round module of cotton from the feeder bed.

12. The round module opener of claim 10, wherein the first feeder belt is pivotably secured to the first cradle and the second feeder belt is pivotably secured to the second cradle such that the first and the second feeder belts are pivotable inwardly toward each other and the longitudinal centerline with the feeder bed.

13. The round module opener of claim 12, wherein the first and the second peeler belts are pivoted inwardly toward each other as the first and second cradles are moved outwardly to lower the round module of cotton onto the feeder bed.

14. The round module opener of claim 13, wherein the first and the second peeler belts are rotated in opposing directions to lower the round module of cotton onto the feeder bed.

* * * * *